United States Patent
Sun et al.

(10) Patent No.: US 11,483,817 B2
(45) Date of Patent: Oct. 25, 2022

(54) ASPECTS OF NEW RADIO PDCCH DESIGN

(71) Applicant: QUALCOMM Incorporated, San Diego, CA (US)

(72) Inventors: Jing Sun, San Diego, CA (US); Wanshi Chen, San Diego, CA (US); Tingfang Ji, San Diego, CA (US); Tao Luo, San Diego, CA (US); Heechoon Lee, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/909,817

(22) Filed: Jun. 23, 2020

(65) Prior Publication Data
US 2020/0322936 A1 Oct. 8, 2020

Related U.S. Application Data

(62) Division of application No. 15/718,914, filed on Sep. 28, 2017, now Pat. No. 10,721,722.
(Continued)

(51) Int. Cl.
*H04W 72/04* (2009.01)
*H04L 5/00* (2006.01)

(52) U.S. Cl.
CPC ......... *H04W 72/042* (2013.01); *H04L 5/0023* (2013.01); *H04L 5/0035* (2013.01);
(Continued)

(58) Field of Classification Search
CPC ... H04W 72/042; H04W 72/04; H04W 72/02; H04L 5/0023; H04L 5/0035; H04L 5/0094; H04L 5/0053; H04L 5/001; H04L 5/0048
See application file for complete search history.

(56) References Cited

U.S. PATENT DOCUMENTS 8,976,698 B2 3/2015 Chen et al.
2012/0314686 A1* 12/2012 Huang .................... H04W 8/26
370/330
(Continued)

FOREIGN PATENT DOCUMENTS

| TW | 201244516 A | 11/2012 |
|---|---|---|
| TW | 201601572 A | 1/2016 |
| WO | 2014025380 A1 | 2/2014 |

OTHER PUBLICATIONS

Taiwan Search Report—TW106133826—TIPO—dated Apr. 16, 2021.
(Continued)

*Primary Examiner* — Candal Elpenord
(74) *Attorney, Agent, or Firm* — Qualcomm Incorporated

(57) ABSTRACT

The present disclosure describes various aspects of the implementation and design of Physical Downlink Control Channel (PDCCH) in 5G new radio (NR) applications. Aspects include methods, apparatuses, and computer-readable medium for one or more of multiple PDCCH search spaces, control resource block (CRB), irregular multiple slots or mini-slots grants, or fast control channel signaling for grant-free uplink (UL). For example, different scheduling entities can each have one or two search spaces defined (e.g., common and/or user equipment (UE)-centric search spaces). Also, CRBs can be used as units for PDCCH transmission instead of resource element groups/control channel elements (REGs/CCEs). In addition, irregularities in time domain, frequency domain, or both can be introduced in the granting of resource blocks (RBs) over multiple slots or mini-slots. Moreover, signaling can be used to indicate to a UE configured for grant-free UL the portion of the pool of resources available for grant-free UL.

20 Claims, 12 Drawing Sheets

Related U.S. Application Data

(60) Provisional application No. 62/402,748, filed on Sep. 30, 2016.

(52) U.S. Cl.
CPC .......... *H04L 5/0053* (2013.01); *H04L 5/0094* (2013.01); *H04L 5/001* (2013.01); *H04L 5/0048* (2013.01)

(56) References Cited

U.S. PATENT DOCUMENTS

| | | | |
|---|---|---|---|
| 2013/0195021 | A1 | 8/2013 | Kalfon et al. |
| 2014/0086184 | A1* | 3/2014 | Guan ............... H04L 5/001 370/329 |
| 2014/0219211 | A1 | 8/2014 | Baker et al. |
| 2014/0376486 | A1* | 12/2014 | Lee ................ H04W 74/0833 370/329 |
| 2015/0146604 | A1* | 5/2015 | Kim ................ H04L 1/1861 370/312 |
| 2015/0230215 | A1* | 8/2015 | Ye ................... H04L 5/0053 370/329 |
| 2015/0256306 | A1* | 9/2015 | Kim ................ H04L 5/0035 370/329 |
| 2018/0098308 | A1 | 4/2018 | Sun et al. |
| 2018/0254853 | A1 | 9/2018 | Jung et al. |
| 2019/0007812 | A1* | 1/2019 | Shilov .................. H04W 4/46 |

OTHER PUBLICATIONS

CATT: "Discussion on DMRS-based Open-Loop MIMO", 3GPP Draft, R1-164224, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096526, 5 Pages, Retrieved from the Internet: URL:http://www.3gpp.org/ftp/tsg_ran/WG1_RL1/TSGR1_85/Docs/ [retrieved on May 14, 2016].

China Telecom: "On Search Space of ePDCCH", 3GPP Draft; R1-120581, 3rd Generation Partnership Project (3GPP), Mobile Competence Centre; 650, Route Des Lucioles; F-06921 Sophia-Anti Polis Cedex; France, vol. RAN WG1, No. Dresden, Germany; Feb. 1, 2012, XP050563240, [retrieved on Feb. 1, 2012], 4 pages.

Fujitsu: "Motivation, Requirements and Design for Common Search Space on Enhanced Downlink Control Channels", 3GPP Draft; R1-122075, 3rd Generation Partnership Project (3GPP), Mobile Competence Centre; 650, Route Des Lucioles; F-06921 Sophia-Anti Polis Cedex; France, vol. RAN WG1, No. Prague, Czech Republic; May 12, 2012, XP050600364, [retrieved on May 12, 2012], 3 pages.

Huawei et al., "On M-PDCCH Search Spaces", 3GPP Draft; R1-155672, 3rd Generation Partnership Project (3GPP), Mobile Competence Centre; 650, Route Des Lucioles; F-06921 Sophia-Anti Polis Cedex; France, vol. RAN WG1, No. Malmo, Sweden; Oct. 4, 2015, XP051002515, Retrieved from the Internet: URL:http://www.3gpp.org/flp/Meetings_3GPP_SYNC/RAN1/Docs/ [retrieved on Oct. 4, 2015], 4 pages.

International Search Report and Wri I I En Opinion—PCT/US2017/054463—ISA/EPO—dated Jun. 18, 2018, 24 Pages.

Nokia Networks: "Transmission Mode for Elevation BF and FD-MIMO", 3GPP Draft, R1-157160 Transmission Mode Final, 3rd Generation Partnership-Project (3GPP), Mobile Competence Centre, 650, Route Des Lucioles, F-06921 Sophia-Antipolis Cedex, France vol. RAN WG1, No. Anaheim, USA, Nov. 15, 2015-Nov. 22, 2015, Nov. 15, 2015 (Nov. 15, 2015), XP051003415,4 Pages, Retrieved from the Internet: URL:http://www.3gpp.org/ftp/Meetings_3GPP_SYNC/RAN1/Docs/ [retrieved on Nov. 15, 2015].

Partial International Search Report—PCT/US2017/054463—ISA/EPO—dated Feb. 1, 2018.

Samsung: "Considerations for New Multiple Access Schemes", 3GPP Draft, R2-165169 Considerations for New Multiple Access Schemes, 3rd Generation Partnership Project (3GPP), Mobile Competence Centre, 650, Route Des Lucioles , F-06921 Sophia-Antipolis Cedex, F, vol. RAN WG2, No. Gothenburg, Sweden; Aug. 22, 2016-Aug. 26, 2016, Aug. 21, 2016 (Aug. 21, 2016), XP051140929, 4 Pages, Retrieved from the Internet: URL:http://www.3gpp.org/ftp/Meetings 3GPP SYNC/RAN2/Docs/ [retrieved on Aug. 21, 2016].

Zte et al., "Discussion on Grant-Free Concept for UL mMTC", 3GPP Draft, R1-166405, Discussion On Grant-Free Concept for UL mMTC, 3rd Generation Partnership Project (3GPP), Mobile Competence Centre, 650, Route Des Lucioles, F-06921 Sophia-Antipolis Cedex, FRA, vol. Ran WG1, No. Gothenburg. Sweden, Aug. 22, 2016-Aug. 26, 2016, Aug. 21, 2016 (Aug. 21, 2016), XP051140211, 5 Pages, Retrieved from the Internet: URL:http://www.3gpp.org/ftp/Meetings_3GPP_SYNC/RAN1/Docs/ [retrieved on Aug. 21, 2016].

European Search Report—EP22156204—Search Authority—The Hague—dated May 11, 2022.

LG Electronics: "Discussion on M-PDCCH Common Search Space", 3GPP Draft, R1-155365, 3GPP TSG RAN WG1 Meeting #82bis, Discussion on M-PDCCH Common Search Space, 3rd Generation Partnership Project (3GPP), Mobile Competence Centre, 650, F-06921, Sophia-Antipolis Cedex, France, vol. RAN WG1, No. Malmo, Sweden, Oct. 5, 2015-Oct. 9, 2015, Sep. 26, 2015, XP051021541, pp. 1-4, Retrieved from the Internet: URL: http://www.3gpp.org/ftp/tsg_ran/WG1_RL1/TSGR1_82b/Docs/ [retrieved on Sep. 26, 2015] p. 1 second Agreement point.

* cited by examiner

ASPECTS OF NEW RADIO PDCCH DESIGN

CLAIM OF PRIORITY UNDER 35 U.S.C. § 119

This application is a divisional of pending U.S. patent application Ser. No. 15/718,914, titled "Aspects of New Radio PDCCH Design," filed Sep. 28, 2017, which claims the benefit U.S. Provisional Pat. App. No. 62/402,748, titled "Aspects of New Radio PDCCH Design," filed Sep. 30, 2016, each which is assigned to the assignee thereof, and incorporated herein by reference in its entirety.

BACKGROUND

Aspects of this disclosure relate generally to telecommunications, and more particularly to techniques related to Physical Downlink Control Channel (PDCCH) in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

It is envisaged that 5G NR will provide more flexibility in wireless communications. This increased flexibility can apply to different aspects of wireless communications, including the various mechanisms and techniques used for scheduling or conveying (e.g., signaling) information about assignments and/or availability of communications resources. Accordingly, there is a need for new techniques in the implementation and design of PDCCH that would enable and support the improvements in wireless communications flexibility provided by 5G NR.

SUMMARY

The present disclosure provides for new implementations and designs related to various aspects PDCCH as used in 5G NR wireless communications.

In an aspect, the disclosure describes a method of wireless communications that includes identifying from information in a control channel, at a user equipment (UE), multiple common search spaces on a carrier from one or more nodes; monitoring the multiple common search spaces; and communicating with at least one of the one or more nodes based on the monitored multiple common search spaces.

Additionally or alternatively, the method may include identifying in the information in the control channel multiple control resource blocks (CRBs) for the control channel, where each CRB having both reference signal (RS) and data resource elements (REs), and where the RS and the data REs within each CRB are precoded using the same precoding (e.g., are precoded in the same fashion).

Additionally or alternatively, the method may include identifying from the information in the control channel, resource blocks (RBs) granted across multiple slots, where the same RBs are granted across a subset of the multiple slots or arbitrary RBs are granted across all the multiple slots; and identifying from the information in the control channel over which slots of the multiple slots are the RBs granted.

In another aspect, the disclosure describes a method of wireless communications that includes identifying, at a scheduling entity, a portion of a pool of resources available for grant-free uplink (UL); and transmitting a fast control channel signal including information that indicates the portion of the pool of resources available for grant-free UL to one or more user equipment (UE) configured for grant-free UL.

In yet another aspect, the disclosure describes an apparatus for wireless communications that includes a transceiver, a memory storing instructions, and a processor communicatively coupled to the transceiver and the memory, where the processor is configured to execute the instructions to identify from information in a control channel, at a UE, multiple common search spaces on a carrier from one or more nodes; monitor the multiple common search spaces; and communicate, via the transceiver, with at least one of the one or more nodes based on the monitored multiple common search spaces.

In another aspect, the disclosure describes an apparatus for wireless communications that includes a transceiver, a memory storing instructions, and a processor communicatively coupled to the transceiver and the memory, where the processor is configured to execute the instructions to identify, at a scheduling entity, a portion of a pool of resources available for grant-free UL; and transmit, via the transceiver, a fast control channel signal including information that indicates the portion of the pool of resources available for grant-free UL to one or more UEs configured for grant-free UL.

In another aspect, the disclosure describes a method of wireless communications for multiple PDCCH search spaces. The method may include identifying, at a UE, multiple types of scheduling entities supported by the UE, and monitoring at least one PDCCH search space for each of the multiple types of scheduling entities. Each of the multiple types of scheduling entities may have defined a different PDCCH common search space, a different UE-specific search space, or both. In one example, each search space may have its own resource element group/control channel element (REG/CCE) space. In another example, the multiple types of scheduling entities may be coordinated and each search space may share a same REG/CCE space.

In another aspect, the disclosure describes a method of wireless communications for CRB in PDCCH. The method may include generating multiple control CRBs for PDCCH, each CRB having both a reference signal (RS) and data resource elements (REs), and precoding the multiple CRBs such that the RS and the data REs within each CRB are precoded in the same fashion. In an aspect, a same beamforming may be used for precoding each of the multiple CRBs. In another aspect, each of the multiple CRBs may be independently precoded. The multiple CRBs may be localized or distributed. In another aspect, each CRB of the multiple CRBs may be configured to support dual-stage PDCCH by having a first stage of the PDCCH in data REs in a first orthogonal frequency-division multiple (OFDM) symbol and a second stage of the PDCCH in data REs in a second OFDM symbol.

In another aspect, the disclosure describes a method of wireless communications for irregular multiple slots or mini-slots grant in PDCCH. The method may include identifying resource blocks (RBs) to be granted across multiple slots, wherein the same RBs are to be granted across a subset of the multiple slots or arbitrary RBs are to be granted across all the multiple slots, and transmitting, in PDCCH, information about which RBs are to be granted and over which slots of the multiple slots. When the same RBs are to be granted across a subset of the multiple slots, the PDCCH may include a bitmap representative of an RB allocation pattern or an index representative of a predefined RB allocation pattern. When arbitrary RBs are to be granted across all the multiple slots, the arbitrary RBs may be sequentially numbered across the multiple slots.

In yet another aspect, the disclosure describes a method of wireless communications for fast control channel signaling for grant-free UL in PDCCH. The method may include identifying a portion of a pool of resources available for grant-free UL, and transmitting a fast control channel including information that indicates the portion available for grant-free UL to one or more UEs configured for grant-free UL. The information may be transmitted via PDCCH or configured via Radio Resource Control (RRC). The information may include a list of all pool resources available for grant-free UL or an indication of the portion of the pool of resources that is currently available for grant-free UL. In an aspect, identifying a portion of a pool of resources available for grant-free UL may include dynamically identifying the portion of a pool of resources available for grant-free UL includes. In an aspect, transmitting a fast control channel may include transmitting the fast control channel when there is a change in the portion of the pool of resources available for grant-free UL.

Each of the various methods described in this disclosure can be implemented as an apparatus with means for performing the specific functions and/or features described in the respective method. Moreover, each of the various methods described in this disclosure can be implemented as a computer-readable medium storing code that when executed by a processor or similar hardware device performs the specific functions and/or features described in the respective method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
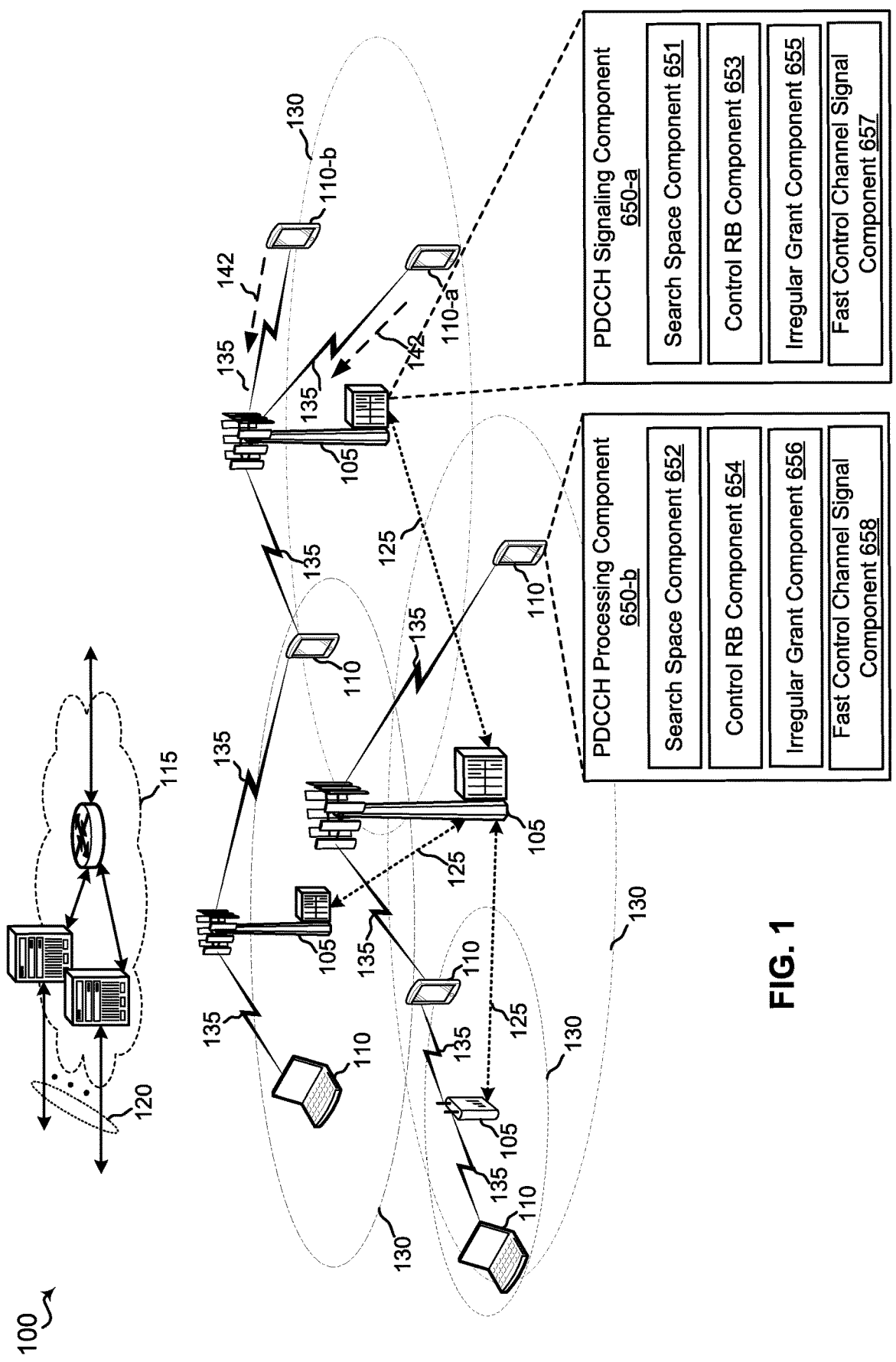
FIG. 1 is a schematic diagram of a wireless communication network in accordance with an aspect of the disclosure.

Various aspects regarding the design or implementation of PDCCH in 5G NR are described below. For example, additional details regarding the design or implementation of multiple PDCCH search spaces, the concept of control resource block (CRB), the design or implementation of irregular multiple slots or mini slots grant, and the use of a fast control signaling for grant-free uplink (UL), are provided below. For example, different scheduling entities can each have one or two search spaces defined (e.g., common and/or user equipment (UE)-centric search spaces). Also, CRBs can be used as units for PDCCH transmission instead of resource element groups/control channel elements (REGs/CCEs). In addition, irregularities in time domain, frequency domain, or both can be introduced in the granting of resource blocks (RBs) over multiple slots or mini-slots. Moreover, signaling can be used to indicate to a UE configured for grant-free UL the portion of the pool of resources available for grant-free UL.

In a typical scenario, a UE does not attempt to decode every PDCCH. To impose as few restrictions as possible on the scheduler while at the same time limit the maximum number of blind decoding attempts in the terminal, LTE or legacy wireless technologies define so-called search spaces, which describe the set of CCEs the terminal (e.g., the UE) is supposed to monitor for scheduling assignments/grants relating to a certain component carrier. A search space is a set of candidate control channels formed by CCEs on a given aggregation level, which the terminal is supposed to attempt to decode.

In legacy networks (e.g., LTE networks) there are two types of search spaces used in PDCCH or ePDCCH to control each carrier: common search spaces and UE-specific search spaces. A common search space is shared across all UEs and a UE-specific search space is used on a per UE basis (e.g., there is a search space specific for each UE). UEs decode the PDCCH within 4 UE-specific search spaces and 2 common search spaces. For each carrier, there is a definition of a resource element group (REG) and on top of that there are control channel elements (CCEs). The PDCCH candidates are transmitted using a number of the CCEs. Nine sets of four physical resource elements (REs) known as the REGs make up each CCE. Thus, one CCE can include 36 REs. The number of CCEs used for a PDCCH may be 1, 2, 4, or 8. Each search space comprises a group of consecutive CCEs which could be allocated to a PDCCH called a PDCCH candidate. Thus, the search space in legacy networks uses CCE as a basic unit for control. Different search spaces will have CCE locations within the CCE space. A UE will decode all decoding candidates (e.g., all the hypotheses) in these two search spaces to discover that UE's downlink control information (DCIs). DCI signals (e.g., conveys information regarding scheduling assignments) the allocation of resources to the UE. For example, the UE may use the DCI to schedule UL resources on the PUSCH and DL resources on the PDSCH. There may be different DCI formats, where DCI format 0 is typically used for the allocation of uplink resources while the other formats are typically used for the allocation of downlink resources. The allocation of resources happens in terms of CCEs. The common search space and the UE-specific search space for different UEs are multiplexed at the CCE level. Moreover, across different eNBs (e.g., network entities with different physical cell identifiers or PCIs), the CCE (REG) space is randomized.

In 5G NR applications, however, the DCI may come from different entities, which may be referred to as network entities, transmit or transmission entities, or scheduling entities. For example, the DCI may come from an eNB, from a zone (e.g., for uplink (UL) mobility), or from a Coordinated Multi-Point (CoMP) cooperation set (CCS), or from other types of scheduling entities. A UE, therefore, may be served by more than one scheduling entity. In the past, the UE may have monitored multiple eNBs, but now it may need to monitor different types of scheduling entities. For example, for a carrier a UE may need to monitor two or more of an eNB, a cell, a zone, or a CCS. That is, in legacy networks, a UE may monitor entities of the same type, while for 5G NR a UE may monitor multiple entities of different types.

Figure 2A:
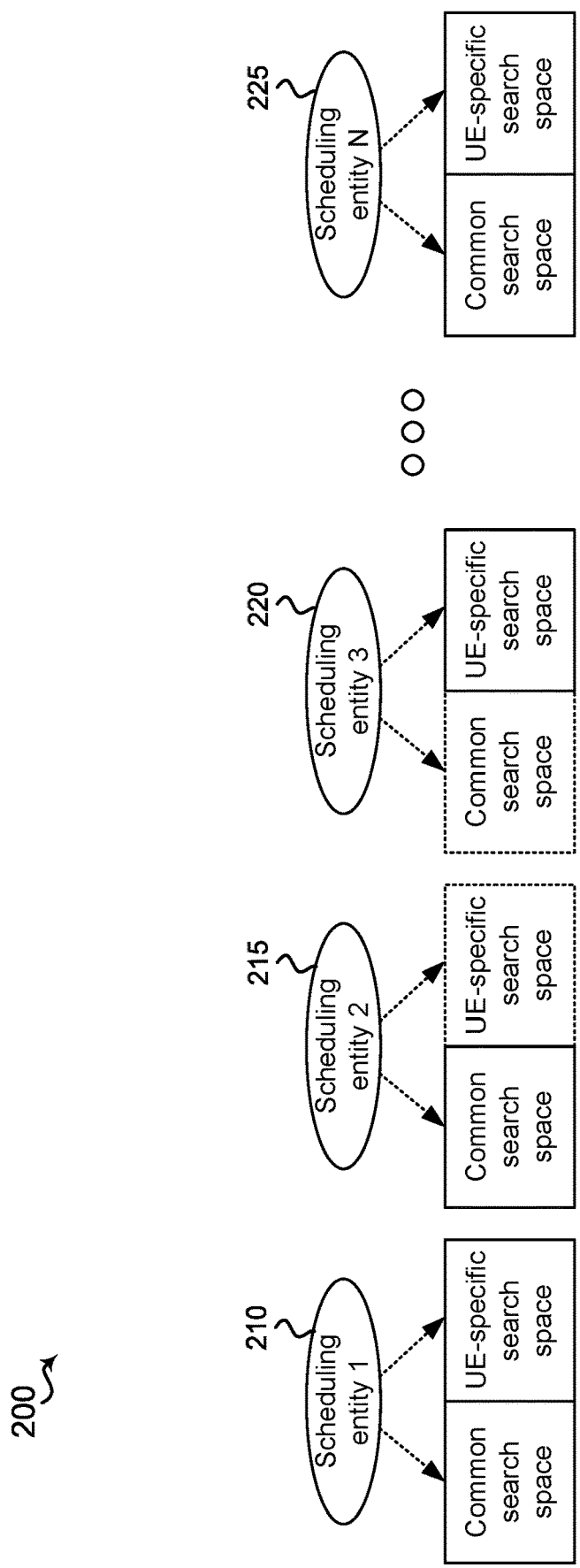
FIG. 2A is a schematic diagram illustrating multiple PDCCH search spaces in accordance with aspects of the disclosure.

An approach to address this difference between 5G NR networks and legacy networks is to define different search spaces for different scheduling entities (see e.g., FIG. 2A). For example, a different or unique search space can be defined for each network entity. As described above, the scheduling entities supported in 5G NR networks for which unique search spaces can be defined may include an eNB, a transmit/receive point (TRP), a zone (e.g., for UL mobility), a CCS, and others. This is in contrast with legacy networks that only support search spaces for eNBs and where the common search space is shared for all UEs. A common search space and a UE-specific search space may be defined for each scheduling entity. In some instances, however, only one or the other search space may need to be defined. For example, while for an eNB as a scheduling entity both a common search space and a UE-specific search space may be defined, for a CCS as a scheduling entity it may be sufficient to define UE-specific search space, while for a zone as a scheduling entity it may be sufficient to define a common search space (see e.g., FIG. 2A). The UE is pre-configured with information about each of the search spaces so that the UE can monitor the search spaces. For example, the UE may be aware of different search space information such as, but not limited to, the DCI format/sizes, the Radio Network Temporary Identifier (RNTI) (e.g., for decoding), the cell identifier (ID) (or other type of identifier), the set of slots to monitor, the number of decoding candidates, and/or other aspects that may be separately managed for each search space.

Figure 2B:
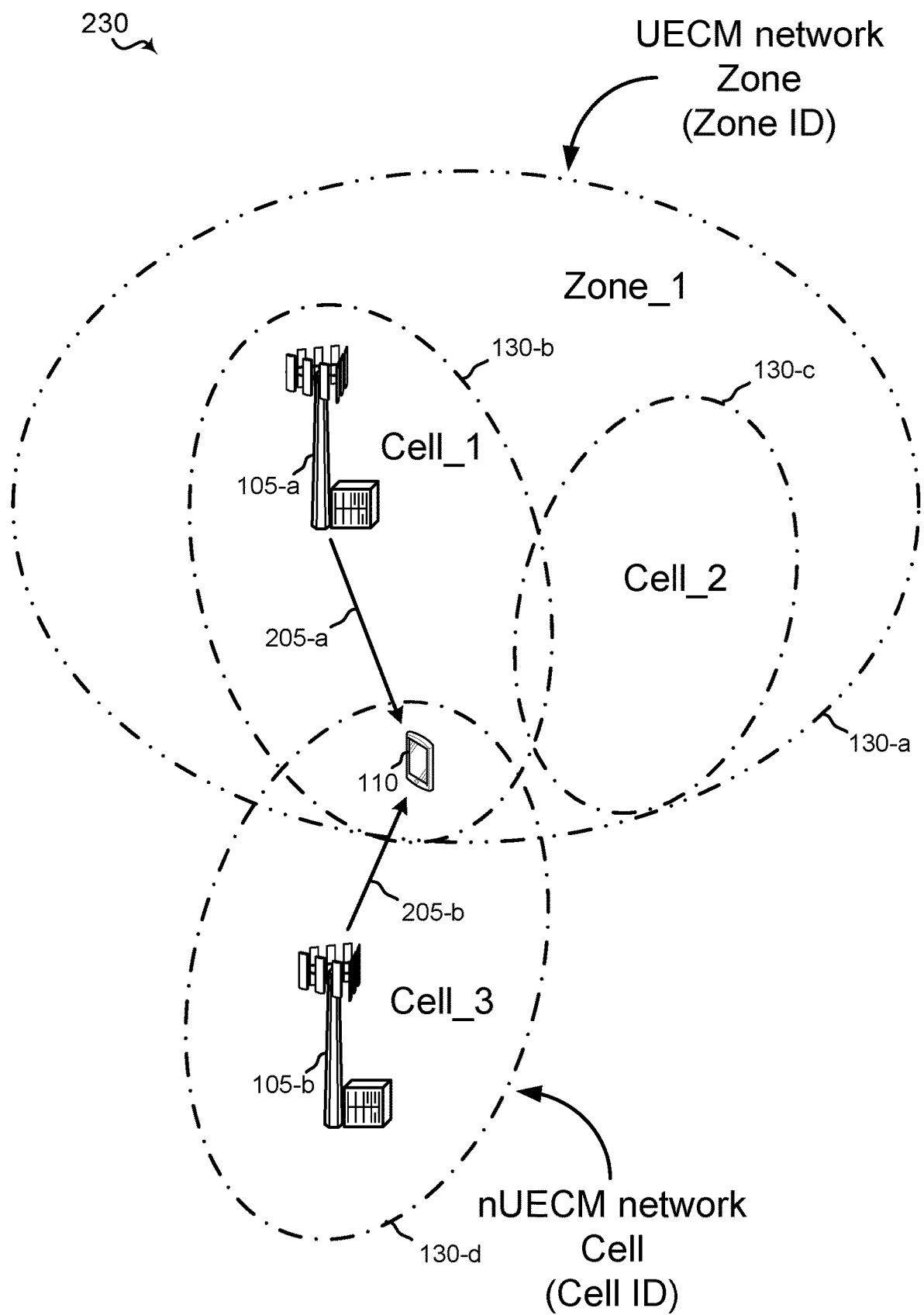
FIG. 2B is a schematic diagram illustrating the use of zones in 5G NR in accordance with an aspect of the disclosure.
Figure 2C:
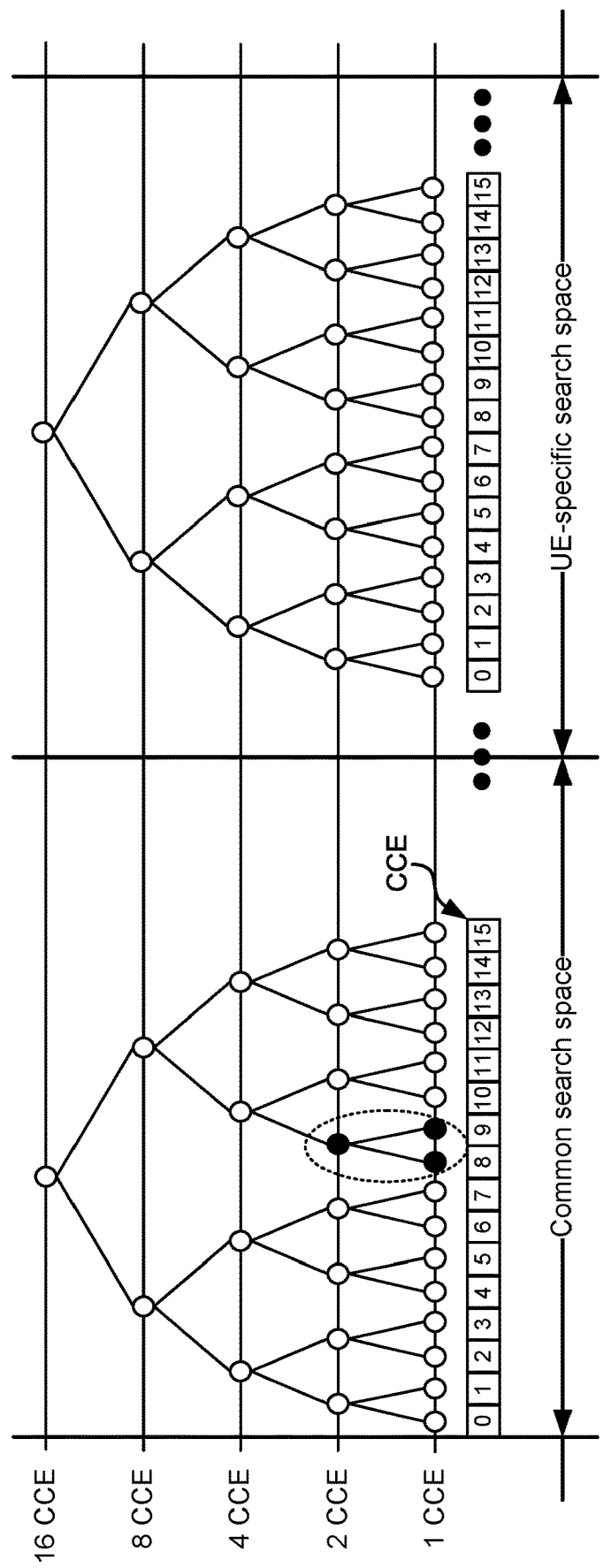
FIG. 2C is a schematic diagram illustrating aggregation levels for multiple PDCCH search spaces in accordance with aspects of the disclosure.

In each search space that a UE can monitor there may be aggregation levels (see e.g., FIG. 2C). Within each of the search spaces, the aggregation levels may be nested. The number of CCEs used for a PDCCH is also referred to as the aggregation level. For example, if aggregation level is 1, a single CCE may be used for the PDCCH. If the aggregation level is 2, two CCEs may be used for the PDCCH. Similarly for aggregation levels 4, 8, and 16, for example as shown in FIG. 2C. Regarding the nesting, if the aggregation level is 2 and CCEs #8 and #9 are being used, it is possible to nest smaller aggregation levels, such as an aggregation level 1 for CCE #8 and an aggregation level 1 for CCE #9. The number of CCEs aggregated for transmission of a particular PDCCH may be determined according to the channel conditions. For example, under good downlink channel conditions, one CCE is likely to be sufficient. However, when a PDCCH is intended for a UE under poor channel conditions (e.g., near the cell border) then a larger number of CCEs may be used (e.g., 8 CCEs or 16 CCEs).

Figure 2D:
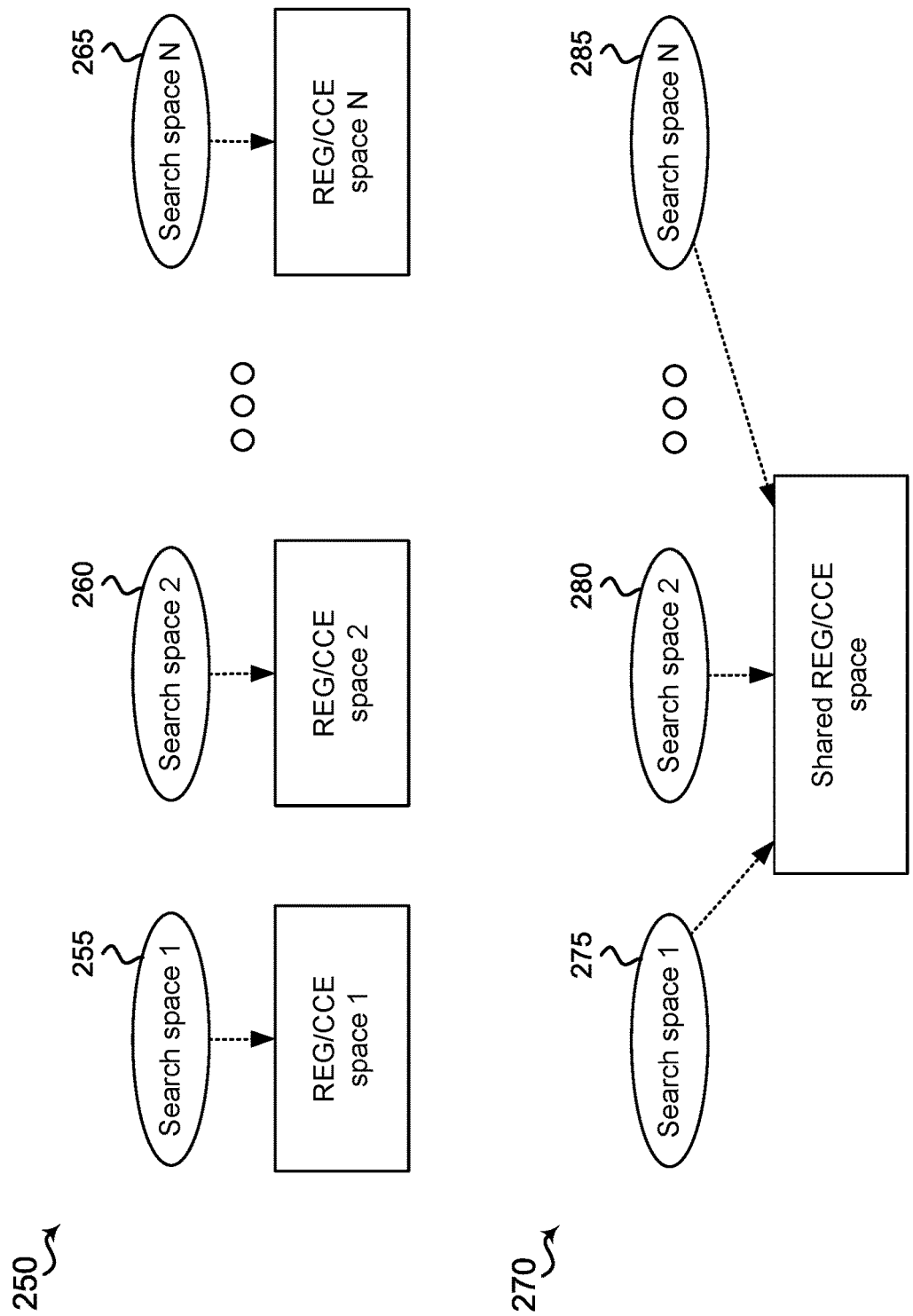
FIG. 2D is a schematic diagram illustrating alternative schemes to manage search space location in accordance with aspects of the disclosure.

In a first alternative of how to manage the search space location, each search space can have its own REG/CCE space (see e.g., FIG. 2D). That is, each scheduling entity may be treated like different eNBs were treated in legacy networks (e.g., LTE networks/systems). Therefore, the location of the REG/CCE depends on the identity of the entity. In legacy networks the identity could be based on PCI, for example). If this approach were applied to 5G NR networks, each search space can be effectively treated as if it were from a different PCI in a legacy network. The issue that may arise in this alternative is that the REG/CCE from different search spaces may conflict or overlap. That is, the CCEs may not be aligned, which may cause collisions. For example, if CCE #1 from a first scheduling entity overlaps with CCEs #0 and #1 of a second scheduling entity, then when using CCE #1 of the first scheduling entity CCEs #0 and #1 of the second scheduling entity may not be used.

In a second alternative of how to manage the search space location, one that may result in fewer conflicts or collisions and may therefore be suitable for the conditions found in 5G NR networks, the same REG/CCE space may be shared across all search spaces but each search space can hash to a different range of CCEs in the same CCE space (see e.g., FIG. 2D). In other words, the REG/CCEs for each scheduling entity may be uniquely defined to avoid conflicts providing search space coordination among the different scheduling entities. In contrast to the first alternative described above, in which the scheduling entities may not be coordinated as in legacy networks, this second alternative allows for the scheduling entities to be coordinated to avoid conflicts or collisions and such coordination can take place in different layers (e.g., with some level of hierarchy involved). Each of the alternatives described above can be similarly implemented with the use of CRBs, which is described in more detail below.

In another aspect, the present disclosure proposes the use of control resource blocks (RBs) in 5G NR networks as a unit for PDCCH. In legacy networks such as LTE, PDCCH is based on units of REGs (e.g., data REs), then CCE (e.g., group of REGs), then DCI with Cell-Specific Reference Signal (CRS) as phase reference for decoding. The CRS is not precoded and is also generally assumed from the same antenna port, which allows a UE to use wideband channel estimation for the PDCCH decoding. The CRS is distributed in frequency within the control symbol.

In 5G NR applications it may be desirable to use beamforming/precoding in connection with PDCCH. For 5G NR networks, because of the use of massive multiple-input-multiple-output (MIMO), millimeter wave (mmWave), and other transmission techniques, the PDCCH may need to be precoded as well for coverage. That is, if beamforming is being applied to data but not to control information, it may be the case that the data is able to reach a UE but not the control information. As such, precoding of both control and data may be desirable in 5G NR applications.

Figure 3:
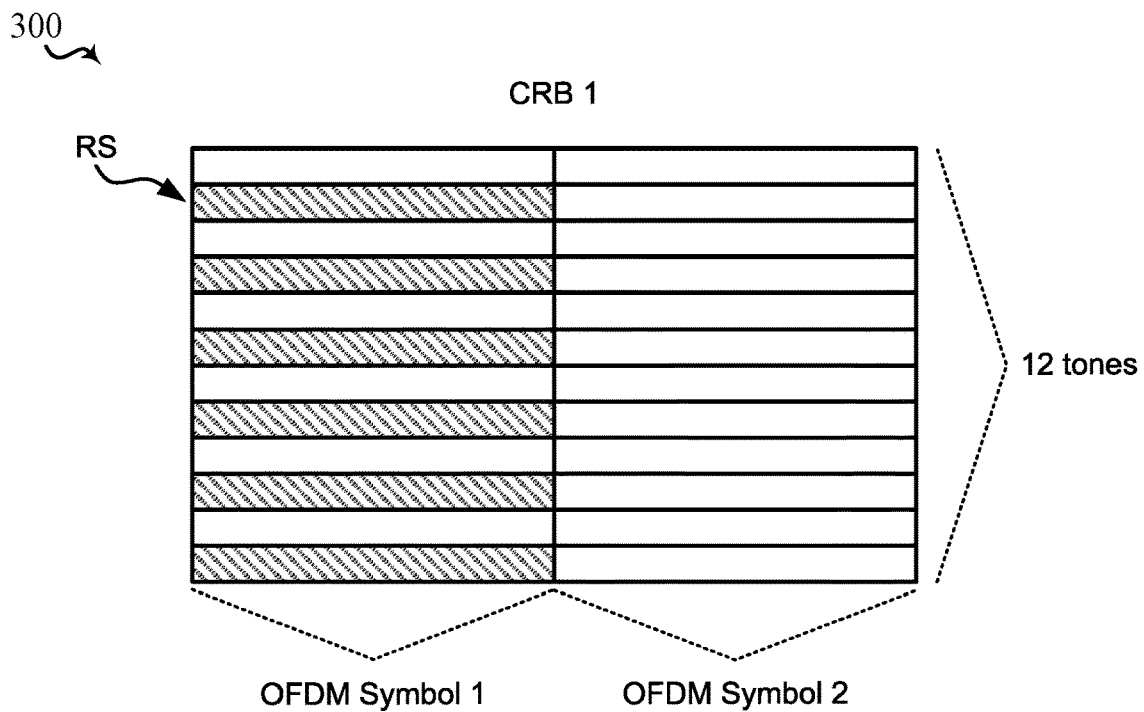
FIG. 3 is a schematic diagram illustrating examples of control resource blocks (CRBs) in accordance with aspects of the disclosure.
Figure 3:
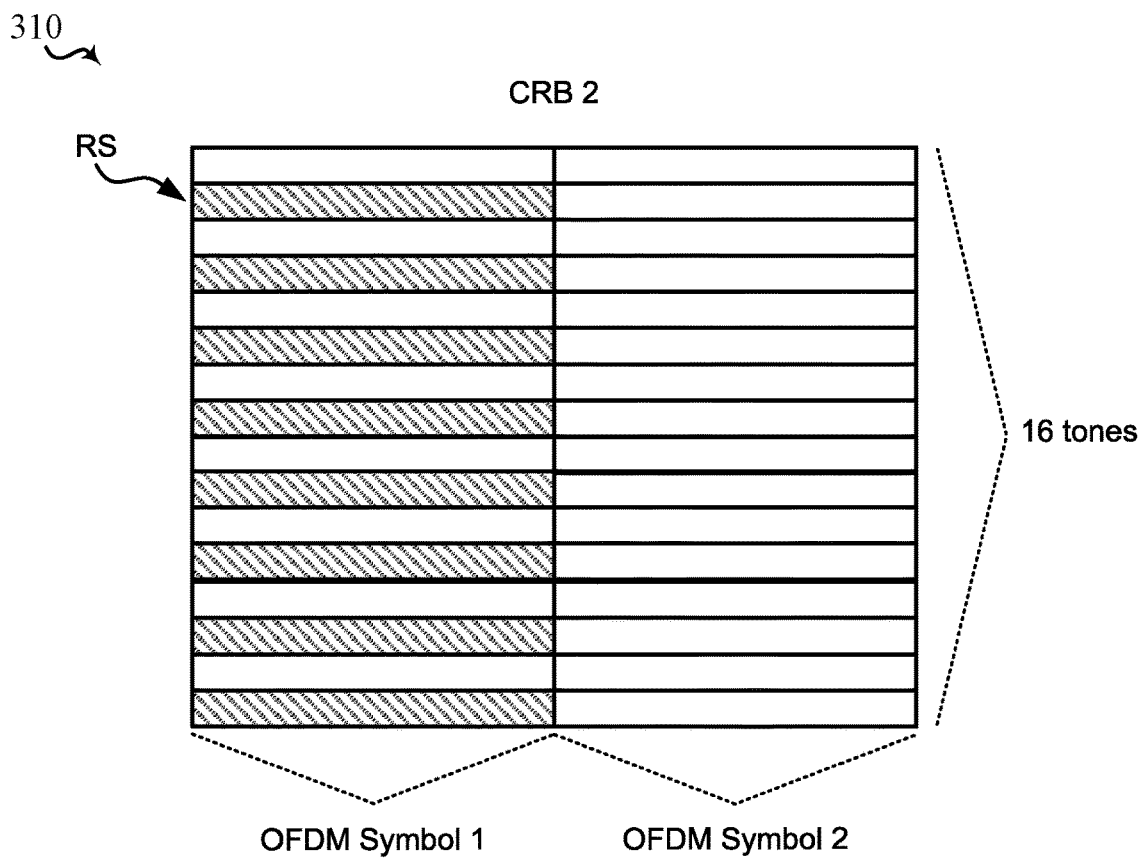

One solution being proposed in this disclosure is to introduce CRBs for PDCCH. In 5G NR, instead of using the REG concept, the CRB can be defined as a new unit for PDCCH, providing a self-contained structure for control. For example, each CRB may be a continuous set of tones in PDCCH (e.g., 12 or 16 continuous tones over 1 or 2 control orthogonal frequency-division multiple (OFDM) symbols). Examples of CRBs having 2 OFDM symbols are illustrated in FIG. 3. For reasonable channel estimation quality, the size of the CRB may not be too small.

The CRB may be configured to contain or include the reference signal (RS) resource (also referred to as control RS resources). The RS resources can be included in the first of two OFDM symbols Within each CRB, the RS and the data resource elements (REs) may be precoded in the same fashion. That is, both the RS and the data REs may be similarly precoded. A special case may be when both the RS and the data REs are not precoded.

As noted above, the CRB may be used to replace the REG concept used in legacy networks, and the CCE may instead be formed by multiple CRBs (e.g., 4 or 6 CRBs). The CRB may therefore be larger than an REG.

There may be different ways to perform the beamforming/precoding across CRBs. For example, in a first alternative, across a set of CRBs, the same beamforming may be used to support wide band channel estimation. This approach may be useful for common PDCCH regions where the RS may be used for tracking and burst detection. The UE is aware or preconfigured with this information to perform the decoding, that is, the UE is configured to perform wideband channel estimation across the CRBs and decode the PDCCH. The UE may be made aware by information included in the CRBs or by some form of RRC configuration. A special case of having the same beamforming across RBs can be not to apply any beamforming at all and simply use an omnidirectional pattern.

In a second alternative, the CRBs may be independently decoded. This type of precoding approach may be configured to adapt to channel variations better. This approach may be a better fit for the case where the CRBs are distributed in frequency. In this approach, the UE may perform a per CRB channel estimation.

The CRBs may be localized and distributed. For example, the concept of the CRB may also include the concepts of virtual CRB and physical CRB. For localized CRB, virtual CRBs may be mapped to continuous physical CRBs for sub-band scheduling gain. For distributed CRBs, virtual CRBs may be mapped to distributed physical CRBs to collect more diversity. For localized CRBs, there need not be any interleaving because a linear mapping is applied. For distributed CRBs, however, interleaving may be used to separate the CRBs and provide diversity.

The CRB concept described above may also be applied to dual-stage PDCCH (or more generally to multi-stage PDCCH). For example, the CRB concept may apply to dual-stage PDCCH when the CRB contains one or more OFDM symbols and the RS may be front loaded (e.g., RS are located in the first OFDM symbol).

In dual-stage PDCCH or dual-stage DCI, the approach is to split the DCI into two parts to have better scheduling flexibility, processing timeline and/or less overhead. The first part of the DCI in the first OFDM symbol may include information that may not depend on the previous physical uplink control channel (PUCCH) feedback, and may be relevant for the early preparation of reception/transmission (RX/TX) later. The second part of the DCI may include information that may depend on the previous PUCCH feedback (e.g., longer timeline to process PUCCH)

When applying CRB to dual-stage PDCCH, the CRB may be assigned to the same UE. In this case, the data REs in the first OFDM symbol may be used for the first part of the DCI, and the data REs in the second OFDM symbol may be used for the second part of the DCI. That is, the first stage of the dual-stage PDCCH is in the first OFDM symbol and the second stage of the dual-stage PDCCH is in the second symbol. The RS may be shared between the two parts, which may be an efficient approach in the case that the RS is precoded.

In another aspect regarding the design or implementation of PDCCH for 5G NR, wireless transmissions in 5G NR may be in units of slots or mini-slots. A mini-slot may be the smallest possible scheduling unit and may be smaller than a slot or a subframe. In one approach, when multiple slots or mini-slots are used, the same set of resource blocks (RBs) may be granted to the UE in a continuous set of slots or mini slots.

To obtain higher flexibility in the time domain, however, a more irregular granting of resources may be desirable. For example, in a first alternative, the same RBs are used across a selected set of (mini-)slots. This can be similar to multi-(mini-)slot grant design but in the case for 5G NR time domain irregularity is introduced. The benefit of such an approach may include leaving some space for other traffic (e.g., ultra-reliable-low latency communications (URLLC)), create allocation pattern that fits some traffic pattern, or both. In this approach, a bitmap may be used to indicate the set of (mini-)slots covered in the grant. Moreover, it is possible to define several time domain patterns to save bits if the full flexibility is not needed.

For example, if the slots (or mini-slots) granted are 0, 1, 3, and 4 (with slot 2 not granted), a bitmap such as (1, 1, 0, 1, 1) may be created to indicate the pattern of the resources being granted to slots 0, 1, 3, and 4. The price or cost of this approach is to include the bitmap in the control message adding to the payload for the PDCCH.

In another example, a set of predefined patterns may be used (e.g., 0101 . . . , or 1001 . . . ), where each pattern is then indicated by an index value in the PDCCH. This approach may require less overhead but also provides less flexibility.

In a second alternative, arbitrary RBs may be used over all slots or mini-slots (e.g., using a longer bitmap). In an aspect, sequentially numbered RBs (or RBGs) may be used in multiple (mini-)slots. For example, if RBs are granted into multiple mini-slots, and the first mini-slot has 10 RBs and the second mini-slot has 11 RBs, then the RBs in the first mini-slot are numbered 1-10 and the RBs in the second mini-slot are numbered 11-21. There may be different RB patterns within each min-slot. Moreover, the resource allocation (RA) in the DCI may work on the concatenated RB/resource block group (RBG) space (may need larger RBG to save bits).

In both alternatives described above, the UE is aware of the approach in order to receive and process the grant.

Additionally or alternatively, a similar approach may be followed to provide a more irregular granting of resources in the frequency domain.

In yet another aspect regarding the design or implementation of PDCCH for 5G NR, the use of fast control signaling (also referred to as fast control channel signaling) for grant-free UL is proposed when 5G NR networks provide for UL applications having a grant-free option. For example, in machine type communication (MTC) or massive MIMO scenarios, when there are a lot of users, it may be desirable to have a grant-free UL approach to reduce the amount of overhead.

In the grant-free option described herein, there may be a pool of UL resources, both orthogonal (e.g., some FDM channels) and non-orthogonal (e.g., CDM/RSMA in each channels). The grant-free design may be used to let a UE hash to one of the resources in the pool without using a grant (e.g., to save grant time and resources). There is the potential for collisions if multiple UEs hash to the same resource.

A grant based implementation or design may also be used in addition to the grant-free option as an enhancement. In such a case, a UE may be granted with one of the resources in the pool for cases where, for example, the UE needs some higher quality-of-service (QoS).

The approaches described above may have an issue of potential collisions between granted UEs and grant-free UEs. That is, the grant-free UEs may not be aware of the granted UEs.

One solution is to add or include a fast control (channel) signaling to help the grant-free UEs identify empty (e.g., not granted) resources in the pool to reduce collision with the granted resources. This may be achieved by providing some dynamic signaling to control the hashing space of the grant-free UEs. Moreover, the signaling may be potentially transmitted in the PDCCH (e.g., faster approach) or may be RRC configured (e.g., slower approach).

In a first alternative, the eNB (or scheduling entity) may maintain a list of the available resources and may send a list of all empty (e.g., not granted) resources to the appropriate UEs. This approach may provide for an accurate resource control, but may require that the signaling be frequently transmitted (e.g., in PDCCH). Moreover, the signaling size might be large.

In a second alternative, the eNB (or scheduling entity) may divide the pool or resources into two parts, for granted and grant-free resources. The resources may be moved (or allocated) between the two parts dynamically and possibly slowly. The eNB may provide for some indication on the grant-free pool of resources in the signaling. If the resources are ordered, the granted resources may be used from the beginning, such that the eNB may only need to include the number of grant-free resources in the signaling.

The behavior of the UE in fast control (channel) signaling for grant-free UL described herein may involve having the grant-free UE decode the signaling, and hash to the available resources. Even if the UE cannot decode the (latest) signaling, resulting in a wrong hashing, the collision rate might be higher, and nothing breaks.

The behavior of the eNB (or scheduling entity) in fast control (channel) signaling for grant-free UL described herein may involve having the eNB send or transmit the signaling, but still try to detect the UL data in all resources. The eNB need not assume that the signaling is correctly received at the UE, which reduces the reliability requirement for the signaling.

Various aspects described above in connection with PDCCH for 5G NR are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Referring to FIG. 1, in accordance with various aspects of the present disclosure, an example wireless communication network 100 includes at least one UE 110 having a PDCC processing component 650-b configured to perform one or more techniques described herein for PDCCH in 5G NR. A base station 105 or other scheduling entity may have a PDCCH signaling component 650-a configured to perform one or more techniques described herein for PDCCH in 5G NR.

In an aspect, the PDCC scheduling component 650-a may be configured to perform aspects or techniques described herein from the perspective of a network or scheduling entity (e.g., base stations 105, eNB, zone, TRP, CCS). As such, the PDCCH scheduling component 650-a may include a search space component 651 for handling multiple PDCCH space search techniques, a control RB component 653 for handling CRB techniques, an irregular grant component 655 for handling irregular multiple slots or mini-slots grants, and a fast control channel signal component 657 for handling fast control channel signaling for grant-free UL.

In another aspect, the PDCC processing component 650-b may be configured to perform aspects or techniques described herein from the perspective of UE (e.g., UE 110) or similar terminal device. As such, the PDCCH scheduling component 650-b may include a search space component 652 for handling multiple PDCCH space search techniques, a control RB component 654 for handling CRB techniques, an irregular grant component 656 for handling irregular multiple slots or mini-slots grants, and a fast control channel signal component 658 for handling fast control channel signaling for grant-free UL.

The wireless communication network 100 may include one or more base stations 105, one or more UEs 110, and a core network 115. As described above, the base stations 105 may be representative of different types of scheduling entities considered for purposes of this disclosure. Moreover, various network entities or devices in the wireless communication network 100 may be referred to as nodes through which a UE 110 can receive a PDCCH from a scheduling entity. For example, a node can be an eNB (or gNB) or base station. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a transmit/receive point (TRP), base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G or 5G NR, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network, or enhancements to such technology networks. The wireless communication network 100 may also be a next generation technology network, such as a 5G wireless communication network. Moreover, the wireless communication network 100 may support high frequency operations such as millimeter wave communications. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a larger geographic area than a pico cell or femto cell (e.g., a public building) and provide restricted access and/or unrestricted access by the UEs having an association with the micro cell. An eNB for a macro cell may be referred to as a macro eNB. An eNB for a small cell may be referred to as a small cell eNB, a pico eNB, a femto eNB, micro eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources).

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein based on the appropriate context. A UE 110 may be configured with multiple downlink CCs and one or more uplink CCs for carrier aggregation. Carrier aggregation may be used with both FDD and TDD component carriers.

Referring to FIG. 2A, a diagram 200 illustrates aspects related to the use of multiple PDCCH search spaces in 5G NR. As shown in the example in the diagram 200, different search spaces can be defined for different scheduling entities. In this example, each of a scheduling entity 1 (210), a scheduling entity 2 (2150), a scheduling entity 3 (220) all the way to a scheduling entity N (225) can have 1 or 2 search spaces defined. In this case, each of the scheduling entity 1 and the scheduling entity N has a common search space and a UE-specific search space defined. In contrast, the scheduling entity 2 has a common search space defined and the UE-specific search space can be optionally defined (dashed lines). Similarly, the scheduling entity 3 has a UE-specific search space defined and the common search space can be optionally defined (dashed lines). As described above, each of the scheduling entities shown in the diagram 200 can be one of different types of scheduling entities such as eNBs, cells, zones, TRPs, or CCS, for example.

FIG. 2B shows a diagram 230 illustrating the use of zones in 5G NR in accordance with an aspect of the disclosure. In an 5G NR system, a network may support various mobility procedures that may be beneficial in various conditions. A downlink based mobility mode may involve the UE measuring signals from one or more cells and the UE or network selecting a serving cell based on the UE measurements. An uplink based mobility mode may involve the UE transmitting an uplink measurement indication signal that the network uses to determine a serving cell for the UE. In uplink based mobility, cells may be organized into synchronized groups referred to herein as zones. As described above, a zone may be a scheduling entity for purposes of multiple PDCCH search spaces. The cells within a zone may form a single frequency network (SFN). One cell within the zone may be selected as the serving cell for a UE, but the UE does not need to be aware of which cell within the zone is the serving cell. Instead, the UE treats the zone as a serving zone. Uplink based mobility procedures for intra-zone mobility and inter-zone mobility may be different.

Similar downlink and uplink based mobility procedures may be adopted for zone mobility where a UE may transition from a serving zone to a target zone based on the measured signal quality between the UE and the serving base station. A zone may refer to a group or combination of cells that act together and are highly synchronized. Thus, a zone may include a plurality of cells operating on the same frequency and/or with the same timing, etc., such that a handover from one cell to another within the zone may be controlled by the network and be transparent to the UE.

Referring back to FIG. 2B, the diagram 230 shows a UE-centric MAC layer (UECM) network zone (e.g., zone_1) having a coverage area 130-a and including at least a cell_1 having a coverage area 130-b and a cell_2 having a coverage area 130-c. The UECM network zone may be a zone associated with at least a portion of the wireless communication system 100 described above with in connection with FIG. 1. A zone, such as zone_1, may refer to a group or combination of cells that act together and are highly synchronized. Because of the coordinated operation of the cells in a zone, the synchronization signals are zone-specific. That is, the synchronization signals transmitted (e.g., broadcast) from a zone are typically single-frequency network (SFN) synchronization signals. A single-frequency network is a broadcast network where several transmitters simultaneously send the same signal over the same frequency channel.

The use of zones in 5G NR networks or other next generation communication systems may be advantageous for mobility management operations. For example, when in a zone, cell reselection may be transparent to a UE. The network may be responsible for cell reselection and mobility, and the UE can be relieved from those responsibilities. Such an approach is not only efficient for the UE, it is also efficient for the network because the number of mobility messages that need to be exchanged with a UE are reduced.

The use of zones in 5G NR networks or other next generation communication systems may also enable certain applications such as massive MIMO, for example. Massive MIMO, which is also known as Large-Scale Antenna Systems, Very Large MIMO, Hyper MIMO, Full-Dimension MIMO and ARGOS, makes use of a very large number of service antennas (e.g., hundreds or thousands) that are operated fully coherently and adaptively. Extra antennas may help by focusing the transmission and reception of signal energy into smaller regions improving throughput and energy efficiency, in particularly when combined with simultaneous scheduling of a large number of user terminals (e.g., tens or hundreds). Massive MIMO was originally envisioned for TDD operation, but can potentially be applied also in FDD operation. Massive MIMO may provide additional benefits, including the use of inexpensive low-power components, reduced latency, simplification of the MAC layer, and robustness to interference and intentional jamming.

Also shown in FIG. 2B is a UE 110 located in an overlapping area or region between the UECM network zone and an nUECM network cell (e.g., cell_3 having coverage area 130-d). The nUECM network cell may be a cell associated with at least a portion of a wireless communication system having a network-centric MAC layer. The UE 110 in the overlapping area may receive unified synchronization signals from base station 105-a in cell_1 of zone_1 and/or from base station 105-b in cell_3. In other words, the UE 110 in the overlapping area may receive synchronization signals from a UECM network zone (e.g., cell_1 in zone_1) and/or from an nUECM network cell (e.g., cell_3). For example, base station 105-a may generate and transmit (e.g., broadcast), unified synchronization signals, which may identify zone_1 and/or cell_1, as well as a nominal tone spacing being used by zone_1. Moreover, base station 105-b may transmit (e.g., broadcast) unified synchronization signals, which may identify cell_3.

After receiving the unified synchronization signals, whether from a UECM network zone or an nUECM network cell, the UE 110 in the overlapping area may process the unified synchronization signals to determine whether the network transmitting the signals is a UECM network or an nUECM network. The UE 110 may also detect, where the network is a UECM network, a nominal numerology (e.g., tone spacing) being used by the network. The UE 110 may detect the nominal numerology based on a number of copies of the unified synchronization signals received from a UECM network. In some aspects, the unified synchronization signals may identify the zone, but may not identify the cell from which the signal is transmitted.

Referring to FIG. 2C, a diagram 240 illustrates aggregation levels for multiple PDCCH search spaces. As described above, within each of the search space (e.g., common search space or UE-specific search space), the aggregation levels may be nested. The number of CCEs used for a PDCCH is also referred to as the aggregation level. For example, if aggregation level is 1, a single CCE may be used for the PDCCH. If the aggregation level is 2, two CCEs may be used for the PDCCH. Similarly for aggregation levels 4, 8, and 16 as shown in the diagram 240. Regarding the nesting, if the aggregation level is 2 and CCEs #8 and #9 are being used (dark circles within dashed lines), it is possible to nest smaller aggregation levels, such as an aggregation level 1 for CCE #8 and an aggregation level 1 for CCE #9. The number of CCEs aggregated for transmission of a particular PDCCH may be determined according to the channel conditions.

Referring to FIG. 2D, diagrams 250 and 270 are shown to illustrate alternative schemes to manage search space location. As described above, in a first alternative, each search space has its own REG/CCE space. The diagram 250 illustrates this by having each of a search space 1 (255), a search space 2 (260) all the way to a search space N (265) have its own REG/CCE space. For example and as shown, search space 1 has its respective REG/CCE space 1, search space 2 has its respective REG/CCE space 2, and search space N has its respective REG/CCE space N. Also as described above, in a second alternative, the same REG/CCE space may be shared across all search spaces as illustrated by the diagram 270. In this case, each of a search space 1 (275), a search space 2 (280) all the way to a search space N (285) have a shared REG/CCE space.

Referring to FIG. 3, and in connection with the CRB concept for PDCCH in 5G NR, diagrams 300 and 310 are shown to illustrate different examples of CBRs with 2 OFDM symbols. The diagram 300 shows a first example of a 12×2 CRB structure that includes 2 OFDM symbols, OFDM symbol 1 and OFDM symbol 2, with 12 tones (resource elements or REs) in each OFDM symbol. Also shown in the diagram 300 are various reference signals (RS), also referred to as control reference signals, that can be included in the first OFDM symbol (e.g., OFDM symbol 1). In this example, one RS is located in every other tone within the first OFDM symbol for a total of 6 RSs.

The diagram 310 shows a second example of a 16×2 CRB structure that includes 2 OFDM symbols, OFDM symbol 1 and OFDM symbol 2, with 16 tones (resource elements or REs) in each OFDM symbol. Also shown in the diagram 310 are various reference signals (RS), also referred to as control reference signals, that can be included in the first OFDM symbol (e.g., OFDM symbol 1). In this example, one RS is located in every other tone within the first OFDM symbol for a total of 8 RSs.

Figure 4A:
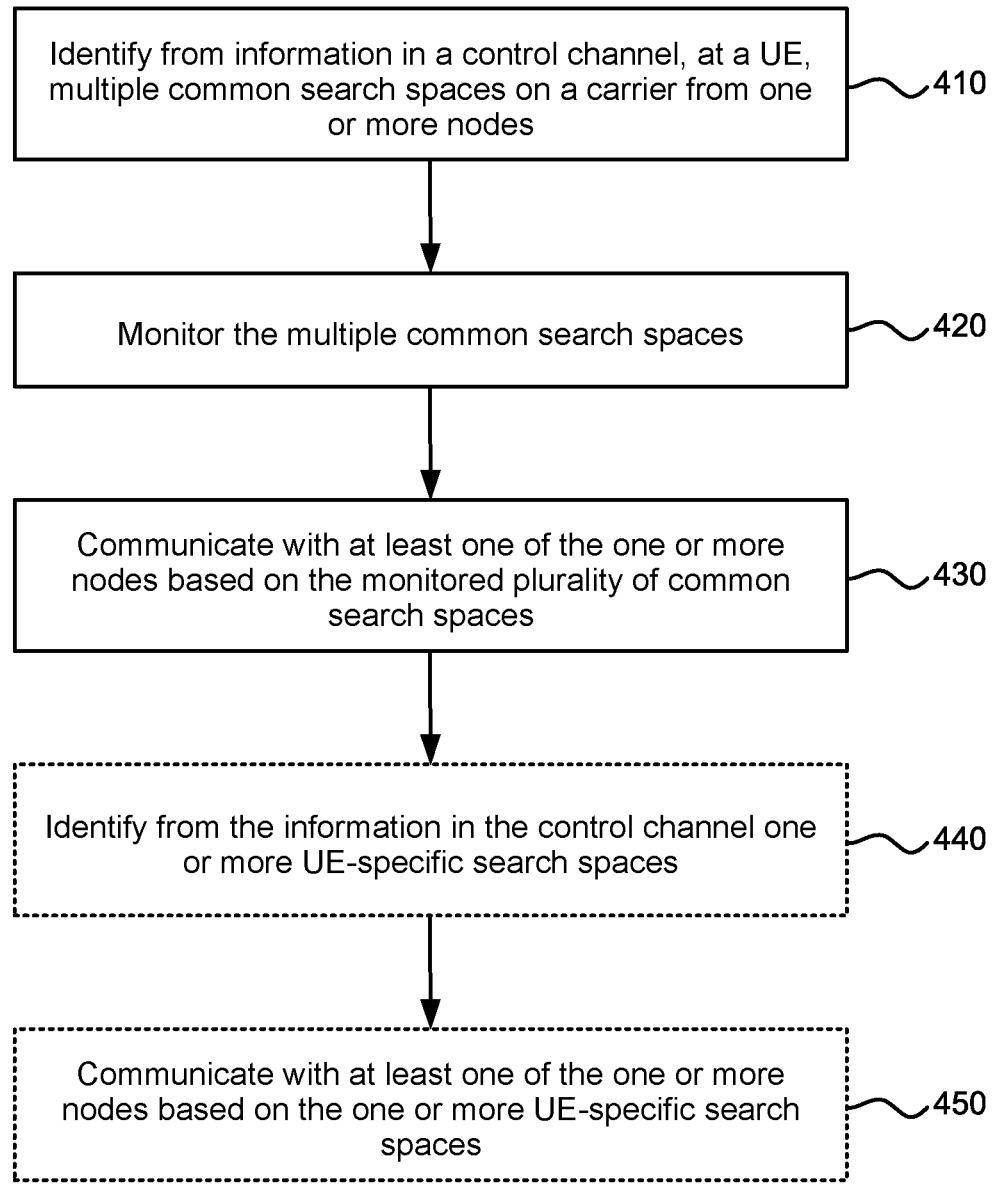
FIG. 4A is a flowchart illustrating an example method of wireless communications using control channel modifications for 5G NR in accordance with aspects of the disclosure.

FIG. 4A is a flowchart illustrating an example method 400 in accordance with aspects of the disclosure. The operations described in connection with the method 400 may be performed by the PDCCH processing component 650-b shown in FIG. 1 and FIG. 6.

At block 410, the method 400 includes identifying from information in a control channel, at a UE (e.g., UE 110), a plurality of common search spaces on a carrier from one or more nodes. PDCCH can then be identified by monitoring the plurality of common search spaces.

The control channel can provide configuration information and/or indexing information (e.g., CCE indexing or CRB indexing) that can specify, or can be used to specify, the location (e.g., start, end, and/or range of allocated resources) for one or more common search spaces and/or one or more UE-specific search spaces for different types of scheduling entities (e.g., eNB, a cell, a zone, or a CCS). That is, a UE (e.g., UE 110) can receive configuration information and/or indexing information to manage the location of search spaces and, based on the information, the UE can identify one or more common search spaces and/or UE-specific search spaces for different types of scheduling entities. In one aspect, the location of the search spaces can be dynamically updated (e.g., dynamically managed) by having the control channel provide updated information.

At block 420, the method 400 includes monitoring the plurality of common search spaces.

At block 430, the method 400 includes communicating with at least one of the one or more nodes based on the monitored plurality of common search spaces.

At block 440, the method 400 may optionally or alternatively include identifying from the information in the control channel one or more UE-specific search spaces.

At block 450, the method 400 may optionally or alternatively include communicating with at least one of the one or more nodes based on the one or more UE-specific search spaces.

The operations or functions associated with the blocks 410, 420, and 440 may be performed by, for example, the search space component 652.

In another aspect of the method 400, each of the plurality of common search spaces is associated with a respective scheduling entity.

In another aspect of the method 400, the plurality of common search spaces comprise at least two of a cell-specific common search space, a zone-specific common search space, a CoMP common search space, where a zone associated with the zone-specific common search space or a CoMP set associated with the CoMP common search space comprises of a plurality of cells.

In another aspect of the method 400, each of the plurality of common search spaces has its own REG/CCE space.

In another aspect of the method 400, each of the plurality of common search spaces shares a same REG/CCE space.

In another aspect of the method 400, at least two of the plurality of common search spaces are partially overlapped.

In another aspect of the method 400, each of the plurality of common search spaces is associated with a respective cell identifier (ID).

Figure 4B:
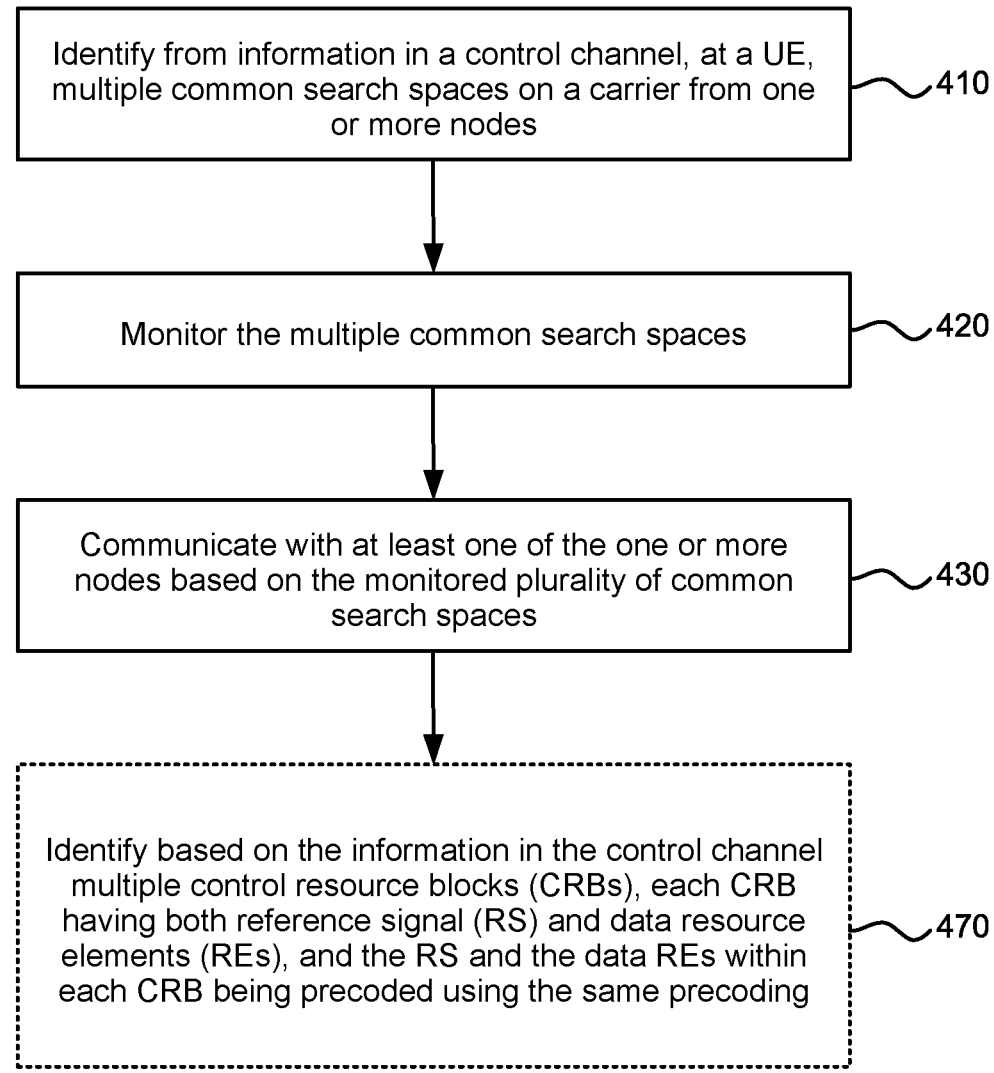
FIG. 4B is a flowchart illustrating another example method of wireless communications using control channel modifications for 5G NR in accordance with aspects of the disclosure.

Referring to FIG. 4B, a flowchart illustrating an example method 460 in accordance with aspects of the disclosure. The operations described in connection with the method 460 may be performed by the PDCCH processing component 650-b shown in FIG. 1 and FIG. 6.

Blocks 410, 420, and 430 in the method 460 are substantially the same as the respective blocks in the method 400 of FIG. 4A.

At block 470, the method 460 may optionally or alternatively include identifying based on the information in the control channel multiple CRBs, each CRB having both RS and data REs, and where the RS and the data REs within each CRB are precoded using the same precoding.

The operations or functions associated with the block 470 may be performed by, for example, the control RB component 654.

In another aspect of the method 460, each of the multiple CRBs is precoded using the same beamforming.

In another aspect of the method 460, each of the multiple CRBs is independently precoded.

In another aspect of the method 460, the multiple CRBs are localized or distributed.

In another aspect of the method 460, each CRB of the multiple CRBs is configured to support dual-stage control channel by having a first stage of the control channel in data REs in a first OFDM symbol of the CRB and a second stage of the control channel in data REs in a second OFDM symbol of the CRB.

Figure 4C:
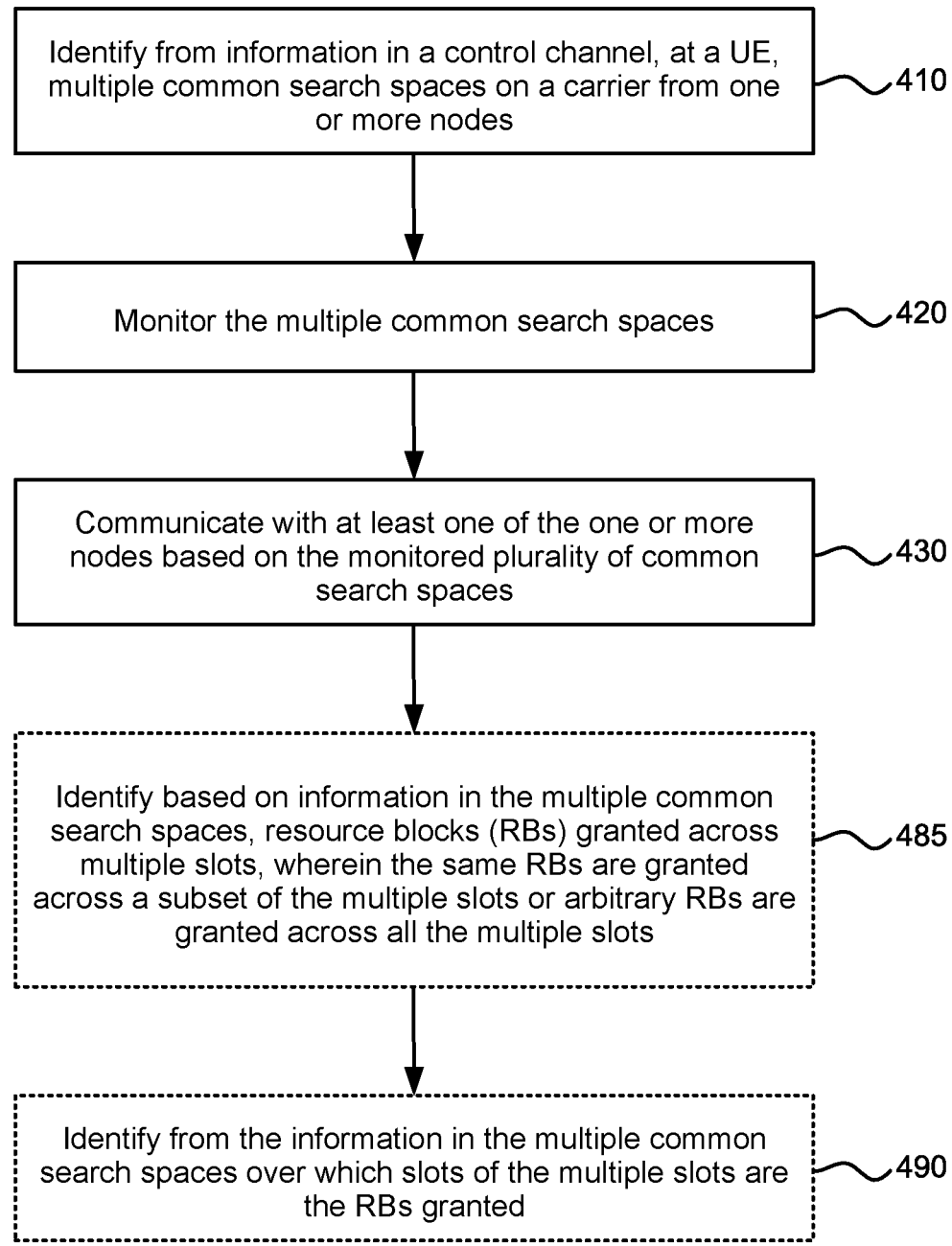
FIG. 4C is a flowchart illustrating yet another example method of wireless communications using control channel modifications for 5G NR in accordance with aspects of the disclosure.

Referring to FIG. 4C, a flowchart illustrating an example method 480 in accordance with aspects of the disclosure. The operations described in connection with the method 480 may be performed by the PDCCH processing component 650-b shown in FIG. 1 and FIG. 6.

Blocks 410, 420, and 430 in the method 480 are substantially the same as the respective blocks in the method 400 of FIG. 4A.

At block 485, the method 480 may optionally or alternatively include identifying based on information in the plurality of search spaces, resource blocks (RBs) granted across multiple slots, wherein the same RBs are granted across a subset of the multiple slots or arbitrary RBs are granted across all the multiple slots.

At block 490, the method 480 may optionally or alternatively include identifying based on the information in the plurality of common search spaces over which slots of the multiple slots are the RBs granted.

The operations or functions associated with the blocks 485 and 490 may be performed by, for example, the irregular grant component 656.

In another aspect of the method 480, when the same RBs are granted across a subset of the multiple slots, the control channel includes a bitmap representative of an RB allocation pattern or an index representative of a predefined RB allocation pattern.

In yet another aspect of the method 480, when arbitrary RBs are granted across all the multiple slots, the arbitrary RBs are sequentially numbered across the multiple slots.

Figure 5A:
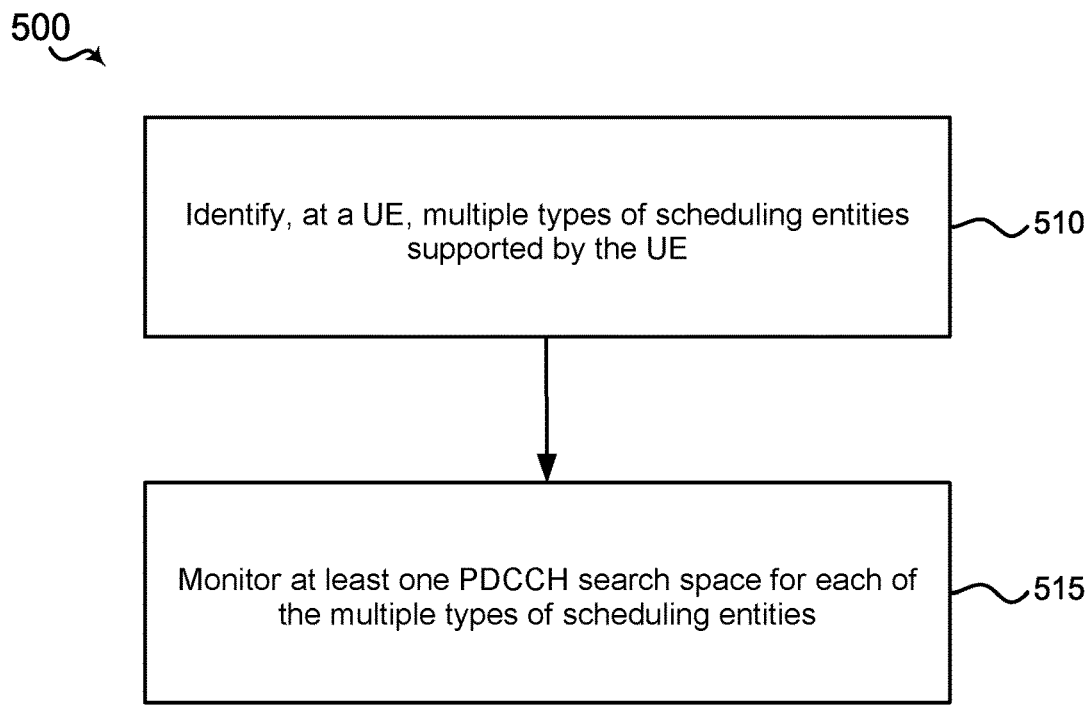
FIG. 5A is a flowchart illustrating a method for using multiple PDCCH search spaces in accordance with aspects of the disclosure.

FIGS. 5A-5D are flowcharts illustrating example methods of wireless communications using PDCCH in 5G NR in accordance with an aspect of the disclosure. 650-a650-b In FIG. 5A, a method 500 for wireless communications and related to multiple PDCCH search spaces is shown that includes, at block 510, identifying, at a UE, multiple types of scheduling entities supported by the UE.

At block 515, the method 500 includes monitoring at least one PDCCH search space for each of the multiple types of scheduling entities.

The operations or functions associated with the blocks 510 and 515 may be performed by, for example, the search space component 652 in the PDCCH processing component 650-b.

Figure 5B:
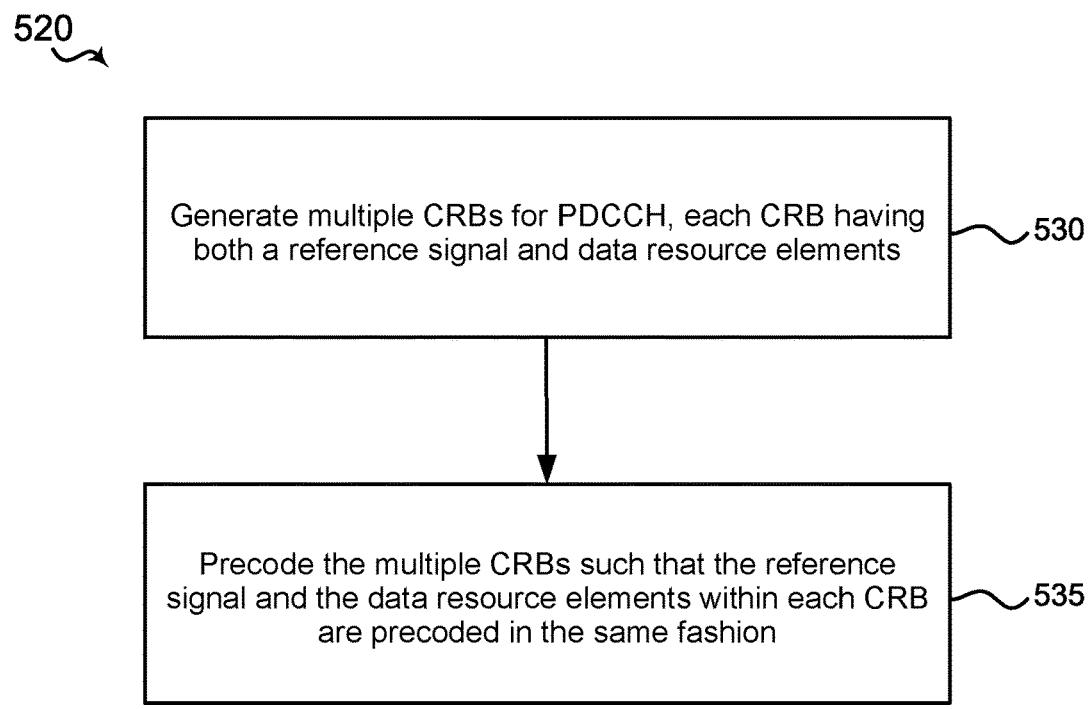
FIG. 5B is a flowchart illustrating a method for using a control resource block (CRB) for PDCCH in accordance with aspects of the disclosure.

In FIG. 5B, a method 520 for wireless communications and related to control RB is shown that includes, at block 530, generating multiple CRBs for PDCCH, each CRB having both a reference signal (RS) and data resource elements (REs).

At block 535, the method 5320 includes precoding the multiple CRBs such that the RS and the data REs within each CRB are precoded in the same fashion.

The operations or functions associated with the blocks 530 and 535 may be performed by, for example, the control RB component 653 in the PDCCH signaling component 650-a.

Figure 5C:
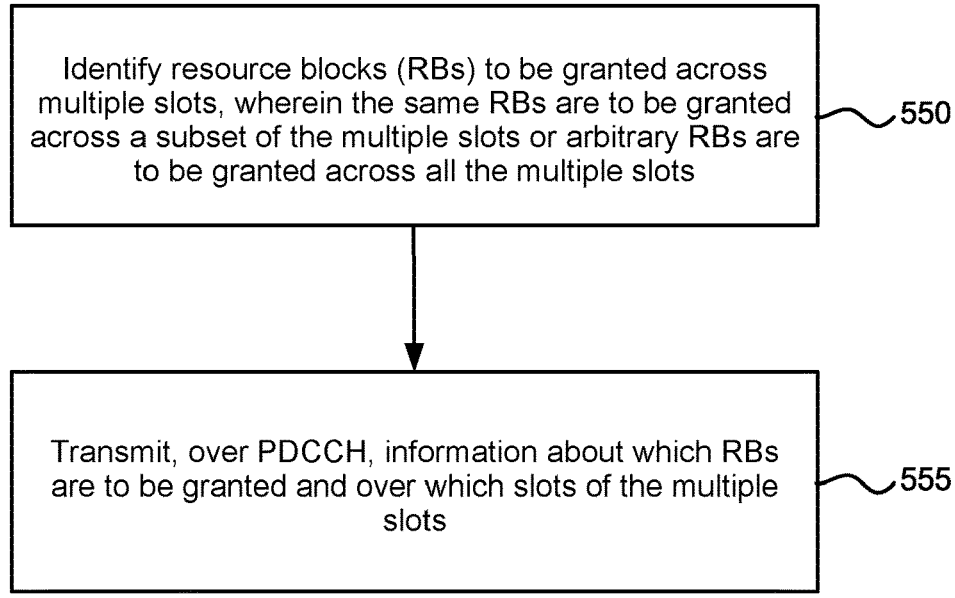
FIG. 5C is a flowchart illustrating a method for using irregular multiple slot or mini-slot grants using PDCCH in accordance with aspects of the disclosure.

In FIG. 5C, a method 540 for wireless communications and related to irregular multiple slot or mini-slot grants is shown that includes, at block 550, identifying resource blocks (RBs) to be granted across multiple slots, wherein the same RBs are to be granted across a subset of the multiple slots or arbitrary RBs are to be granted across all the multiple slots.

At block 555, the method 540 includes transmitting, in PDCCH, information about which RBs are to be granted and over which slots of the multiple slots.

The operations or functions associated with the blocks 550 and 555 may be performed by, for example, the irregular grant component 655 in the PDCCH signaling component 650-a.

Figure 5D:
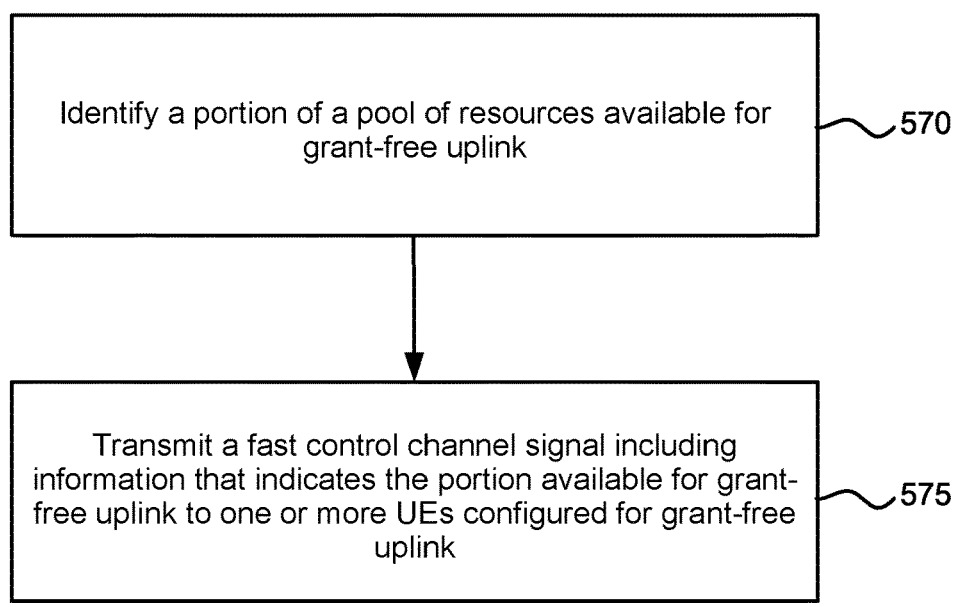
FIG. 5D is a flowchart illustrating a method for using a fast control channel signal to indicate grant-free uplink resources in accordance with aspects of the disclosure.

In FIG. 5D, a method 560 for wireless communications and related to fast control (channel) signaling for grant-free UL is shown that includes, at block 570, identifying a portion of a pool of resources available for grant-free UL.

At block 575, the method 560 includes transmitting a fast control channel including information that indicates the portion available for grant-free UL to one or more user equipment (UE) configured for grant-free UL.

The operations or functions associated with the blocks 570 and 580 may be performed by, for example, the fast control channel signal component 657 in the PDCCH signaling component 650-a.

Figure 6:
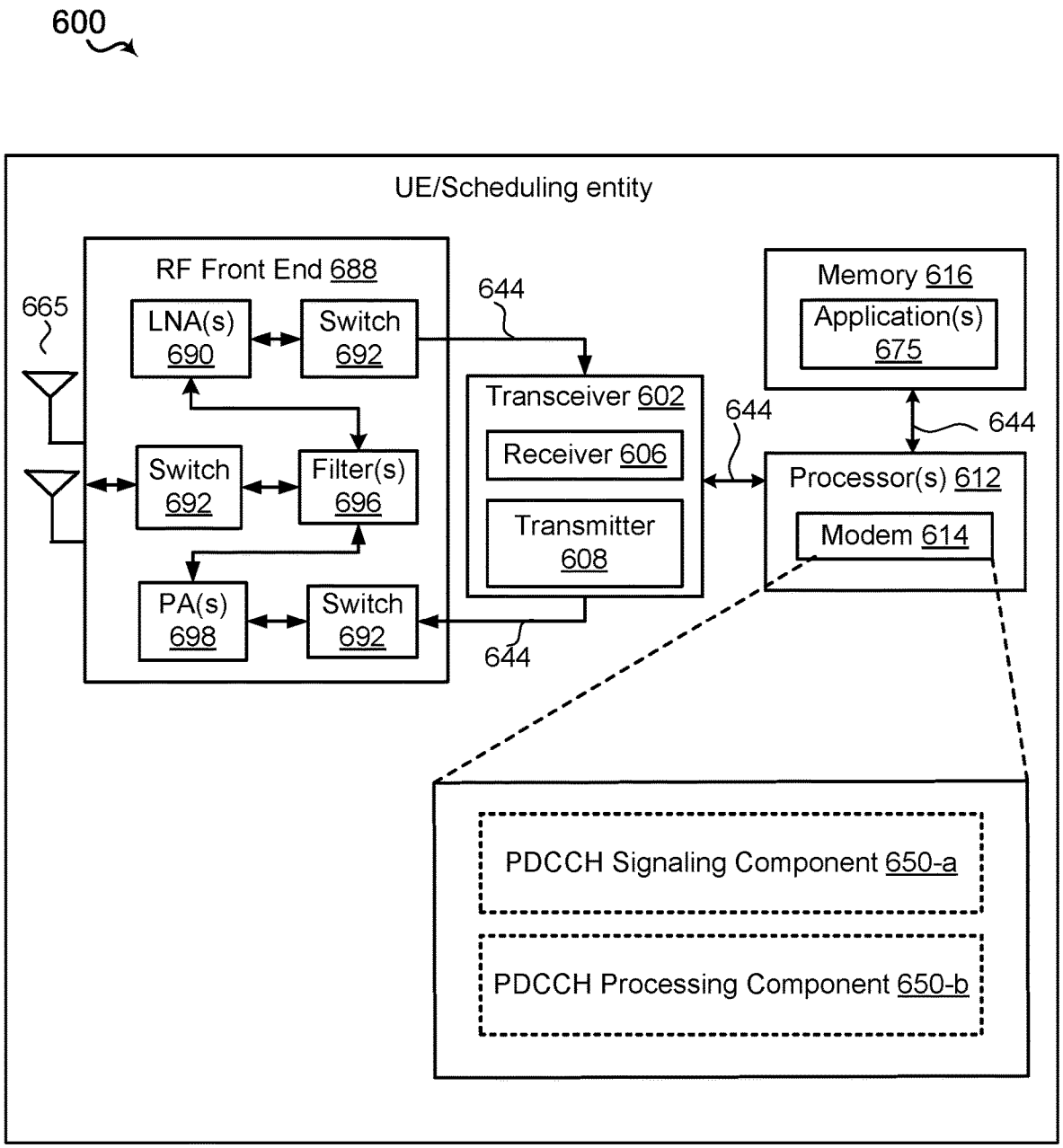
FIG. 6 is a block diagram illustrating an example of a wireless communications device that supports new implementations and designs for PDCCH in 5G NR in accordance with aspects of the disclosure.

FIG. 6 is a block diagram illustrating an example of a device 600, such as a UE, an eNB, or some other scheduling entity, that supports new implementations and designs for PDCCH in 5G NR in accordance with an aspect of the disclosure. FIG. 6 schematically illustrates hardware components and subcomponents for implementing one or more methods (e.g., methods 400, 460, 480, 500, 520, 540, and 560) described herein in accordance with various aspects of the present disclosure. In an example of an implementation, the device 600 may include a variety of components, some of which have already been described above, but including components such as one or more processors 612 and memory 616 and transceiver 602 in communication via one or more buses 644, which may operate in conjunction with the PDCCH signaling component 650-*a* (when the device 600 is a scheduling entity) or the PDCCH processing component 650-*b* (when the device 600 is a UE or terminal device) to enable one or more of the functions described herein related to including one or more methods of the present disclosure. Further, the one or more processors 612, modem 614, memory 6416, transceiver 602, RF front end 6488 and one or more antennas 665, may be configured to support voice and/or data calls (simultaneously or non-simultaneously) in one or more radio access technologies.

In an aspect, the one or more processors 612 can include a modem 614 that uses one or more modem processors. The various functions related to the PDCCH signaling component 650-*a* or the PDCCH processing component 650-*b* may be included in the modem 614 and/or the processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with the transceiver 602. In other aspects, some of the features of the one or more processors 612 and/or the modem 614 associated with the PDCCH signaling component 650-*a* or the PDCCH processing component 650-*b* may be performed by the transceiver 602.

Also, the memory 616 may be configured to store data used herein and/or local versions of applications 675, the PDCCH signaling component 650-*a*, the PDCCH processing component 650-*b*, and/or one or more of their subcomponents being executed by at least one processor 612. The memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, the memory 616 may be a non-transitory computer-readable storage medium that stores one or more computer-executable codes defining the PDCCH signaling component 650-*a*, the PDCCH processing component 650-*b*, and/or one or more of their subcomponents, and/or data associated therewith, when the device 600 is operating at least one processor 612 to execute the PDCCH signaling component 650-*a*, the PDCCH processing component 650-*b*, and/or one or more of their subcomponents (e.g., subcomponents of the PDCCH signaling component 650-*a*, subcomponents of the PDCCH processing component 650-*b*).

The transceiver 602 may include at least one receiver 606 and at least one transmitter 608. The receiver 6406 may include hardware, firmware, and/or software code executable by a processor for receiving data, the code comprising instructions and being stored in a memory (e.g., computer-readable medium). The receiver 606 may be, for example, a radio frequency (RF) receiver. In an aspect, the receiver 606 may receive signals transmitted by at least one base station 105 when, for example, the device 600 is a UE. Additionally, the receiver 606 may process such received signals, and also may obtain measurements of the signals, such as, but not limited to, Ec/Io, SNR, RSRP, RSSI, etc. The transmitter 608 may include hardware, firmware, and/or software code executable by a processor for transmitting data, the code comprising instructions and being stored in a memory (e.g., computer-readable medium). A suitable example of the transmitter 608 may include, but is not limited to, an RF transmitter.

Moreover, in an aspect, the device 600 may include an RF front end 688, which may operate in communication with one or more antennas 665 and transceiver 602 for receiving and transmitting radio transmissions, for example. The RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, the LNA 690 can amplify a received signal at a desired output level. In an aspect, each LNA 690 may have a specified minimum and maximum gain values. In an aspect, the RF front end 688 may use one or more switches 692 to select a particular LNA 690 and its specified gain value based on a desired gain value for a particular application.

Further, for example, one or more PA(s) 698 may be used by the RF front end 688 to amplify a signal for an RF output at a desired output power level. In an aspect, each PA 698 may have specified minimum and maximum gain values. In an aspect, the RF front end 688 may use one or more switches 692 to select a particular PA 6498 and a specified gain value for the particular PA 698 based on a desired gain value for a particular application.

Also, for example, one or more filters 696 can be used by the RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, the RF front end 688 can use one or more switches 692 to select a transmit or receive path using a specified filter 696, LNA 490, and/or PA 698.

As such, the transceiver 602 may be configured to transmit and receive wireless signals through one or more antennas 665 via the RF front end 688. In an aspect, the transceiver 602 may be tuned to operate at specified frequencies such that the device 600 can communicate with other devices. In an aspect, for example, the modem 6 can configure the transceiver 602 to operate at a specified frequency and power level based on the configuration of the device 600 and the communication protocol used by the modem 614.

In an aspect, the modem 614 can be a multiband-multimode modem, which can process digital data and communicate with the transceiver 602 such that the digital data is sent and received using the transceiver 602. In an aspect, the modem 614 can be multiband and be configured to support multiple frequency bands for a specific communications protocol. In an aspect, the modem 614 can be multimode and be configured to support multiple operating networks and communications protocols. In an aspect, the modem 614 can control one or more components of the device 600 (e.g., the RF front end 6488, the transceiver 602) to enable transmission and/or reception of signals based on a specified modem configuration. In an aspect, the modem configuration can be based on the mode of the modem and the frequency band in use. In another aspect, the modem configuration can be based on configuration information associated with the device 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a user equipment (UE), comprising:
   identifying a plurality of common search spaces, each common search space associated with a respective scheduling entity of a plurality of scheduling entities, the plurality of common search spaces comprising at least one of i) a zone-specific common search space associated with a zone having a plurality of cells in which each cell in the zone broadcasts a same common search space, or ii) a coordinated multi-point (CoMP) common search space associated with a CoMP set having a plurality of cells;
   monitoring each of at least two of the identified common search spaces for downlink control information (DCI) specific to the respective scheduling entity;
   decoding DCI from each of the at least two monitored common search spaces; and
   communicating with the respective scheduling entities associated with the decoded DCI.

2. The method of claim 1, wherein each of the plurality of common search spaces is associated with a respective resource element group/control channel element (REG/CCE) space.

3. The method of claim 2, wherein at least one of the plurality of common search space is characterized by nested CCEs, and a quantity of the nested CCEs is based on a condition of the control channel.

4. The method of claim 1, wherein each of the plurality of common search spaces shares a same resource element group/control channel element (REG/CCE) space.

5. The method of claim 4, wherein each of the plurality of common search spaces maps to a different range of CCEs in the same CCE space.

6. The method of claim 1, wherein the at least two monitored common search spaces are partially overlapping in one or both of time and frequency.

7. The method of claim 1, wherein each of the plurality of common search spaces is associated with a respective cell identifier (ID).

8. The method of claim 1, wherein each of the plurality of common search spaces is associated with separately managed characteristics including at least one of: a set of slots to monitor, a number of decoding candidates, a downlink control information (DCI) format, or a Radio Network Temporary Identifier (RNTI).

9. The method of claim 1, wherein identifying comprises preconfiguring the UE with information about at least one common search space.

10. The method of claim 1, wherein identifying comprises receiving, via a control channel, an update regarding a location of at least one common search space.

11. An apparatus for wireless communications, comprising:
    a transceiver;
    a memory storing instructions; and
    a processor communicatively coupled to the transceiver and the memory, the processor being configured to execute the instructions to:
       identify a plurality of common search spaces, each common search space associated with a respective scheduling entity of a plurality of scheduling entities, the plurality of common search spaces comprising at least one of i) a zone-specific common search space associated with a zone having a plurality of cells in which each cell in the zone broadcasts a same common search space, or ii) a coordinated multi-point (CoMP) common search space associated with a CoMP set having a plurality of cells;
       monitor each of at least two of the identified common search spaces for downlink control information (DCI) specific to the respective scheduling entity;
       decode DCI from each of the at least two monitored common search spaces; and
       communicate with the respective scheduling entities associated with the decoded DCI.

12. The apparatus of claim 11, wherein each of the plurality of common search spaces is associated with a respective resource element group/control channel element (REG/CCE) space.

13. The apparatus of claim 12, wherein at least one of the plurality of common search space is characterized by nested CCEs, and a quantity of the nested CCEs is based on a condition of the control channel.

14. The apparatus of claim 11, wherein each of the plurality of common search spaces shares a same resource element group/control channel element (REG/CCE) space.

15. The apparatus of claim 14, wherein each of the plurality of common search spaces maps to a different range of CCEs in the same CCE space.

16. The apparatus of claim 11, wherein the at least two monitored common search spaces are partially overlapping in one or both of time and frequency.

17. The apparatus of claim 11, wherein each of the plurality of common search spaces is associated with a respective cell identifier (ID).

18. The apparatus of claim 11, wherein each of the plurality of common search spaces is associated with separately managed characteristics including at least one of: a set of slots to monitor, a number of decoding candidates, a downlink control information (DCI) format, or a Radio Network Temporary Identifier (RNTI).

19. The apparatus of claim 11, wherein identifying comprises preconfiguring the apparatus with information about at least one of the plurality of common search spaces.

20. The apparatus of claim 11, wherein identifying comprises receiving, via a control channel, an update regarding a location of at least one of the plurality of common search space.

* * * * *